United States Patent [19]
Watanabe et al.

[11] Patent Number: 5,180,145
[45] Date of Patent: Jan. 19, 1993

[54] VIBRATION DAMPING DEVICE

[75] Inventors: Isao Watanabe, Iruma, Japan; John D. Rensel, Tallmadge; David A. Weitzenhof, Akron, both of Ohio

[73] Assignee: Bridgestone Corporation, Tokyo, Japan

[21] Appl. No.: 707,733

[22] Filed: May 30, 1991

[51] Int. Cl.$^5$ ............................................... F16F 9/04
[52] U.S. Cl. .................................. 267/64.24; 188/267; 188/298; 267/140.14
[58] Field of Search ............... 188/267, 298, 351, 313, 188/317, 312, 322.19, 322.22; 267/64.18, 64.22, 64.24, 64.27

[56] References Cited

U.S. PATENT DOCUMENTS

| | | | |
|---|---|---|---|
| 2,642,845 | 6/1953 | Stevens | 188/313 X |
| 3,046,003 | 7/1962 | Schultz | 267/64.24 |
| 3,313,536 | 4/1967 | Dutton et al. | 267/64.24 |
| 3,990,548 | 11/1976 | Schupnes | 188/313 |
| 4,687,589 | 8/1987 | Block et al. | 252/73 |
| 4,702,463 | 10/1987 | Krautkrames | 188/322.19 X |
| 4,854,555 | 8/1989 | Ohkawa et al. | 267/64.24 |
| 4,858,733 | 8/1989 | Noguchi et al. | 188/267 |
| 4,934,667 | 6/1990 | Pees et al. | 267/64.27 X |
| 4,973,031 | 11/1990 | Takano et al. | 267/140.1 |
| 5,018,606 | 5/1991 | Carlson | 188/267 |

FOREIGN PATENT DOCUMENTS

| | | | |
|---|---|---|---|
| 414508 | 2/1991 | European Pat. Off. | 188/298 |
| 255872 | 2/1927 | United Kingdom | 188/298 |

OTHER PUBLICATIONS

Continuously Adjustable Shock Absorbers for Rapid-Acting Ride Control Systems (RCS)—pp. 37-46.

*Primary Examiner*—George A. Halvosa
*Attorney, Agent, or Firm*—Ernst H. Ruf

[57] ABSTRACT

A vibration damping device is comprised of first and second axially spaced end housings adapted to be mounted on spaced apart structures, and has a tapered intermediate member mounted on the second housing converging toward an open end of the first housing. A piston is mounted on an end of a rod which is connected to the first housing and extends through a bore formed in the intermediate member and forms a restricted flow orifice extending between the spaced apart housings. A pair of elastomeric sleeves extend between the intermediate portion and the piston and the first housing to form a pair of fluid chambers connected by the orifice. An elongated electrode preferably contacts an electrorheological fluid flowing between the chambers through the orifice. The tapered intermediate member is nestable within the interior of the first housing when the device is in a jounce condition and the tapered piston is nestable within the interior of the intermediate member when the device is in a rebound condition to provide a compact damping device without sacrificing stroke length, and which enables the length of the electrode to be independent of the stroke length.

14 Claims, 5 Drawing Sheets

VIBRATION DAMPING DEVICE

BACKGROUND OF THE INVENTION

1. Technical Field

The invention relates to vibration damping devices which develop damping performance when being applied to a suspension member, such as for automobiles or other equipment. More particularly, the invention relates to such a damping device using an electrorheological fluid as the damping medium, which device has a shorter axial height than prior similar damping devices, without sacrificing stroke length, and in which the length of the electrode plate for the electrorheological fluid is independent of stroke length.

2. Background Information

Vibration damping devices have been used for a considerable period of time to dampen the vibrational forces applied to the suspension system of vehicles to provide a smoother ride, by reducing the vibrations caused by road bumps and depressions, passing from the tires to the vehicle frame, by the interposing of oil filled shock absorbers or high pressure gas damping devices.

Although these prior art oil and high pressure gas damping devices have proven satisfactory, a more recent development has evolved in which an electrorheological or electroviscous liquid is used within the chambers of the damping device, wherein the liquid is in contact with one or more electrode plates usually mounted in a restrictive passage, which depending upon the size of the electrodes and the amount of voltage applied to the liquid, will change its viscosity, enabling the damping device to have a greater range of damping characteristics than those achieved by the high pressure gas or oil filled shock absorbers.

U.S. Pat. No. 4,973,031 discloses an anti-vibration apparatus which uses an expandable liquid chamber containing an electrorheological fluid in the chamber.

U.S. Pat. No. 4,858,733 discloses another damping device using electrode plates in combination with an electroviscous liquid contained within closed chambers and movable through a restricted passage, where voltage is applied to the electroviscous liquid as it moves through the passage to change its viscosity to achieve various damping effects.

Pending United States patent application Ser. No. 570,659, assigned to the Assignee of the present invention, discloses another vibration damping device of the type shown in FIG. 12 of the present application drawings. This damper uses an electrorheological fluid which passes between two closed chambers formed by elastomeric sleeves, through a restricted orifice, where the fluid comes into contact with electrodes mounted in the restrictive passage. This damping device is believed to be the closest known prior art to the device of the present invention.

Figure 12:
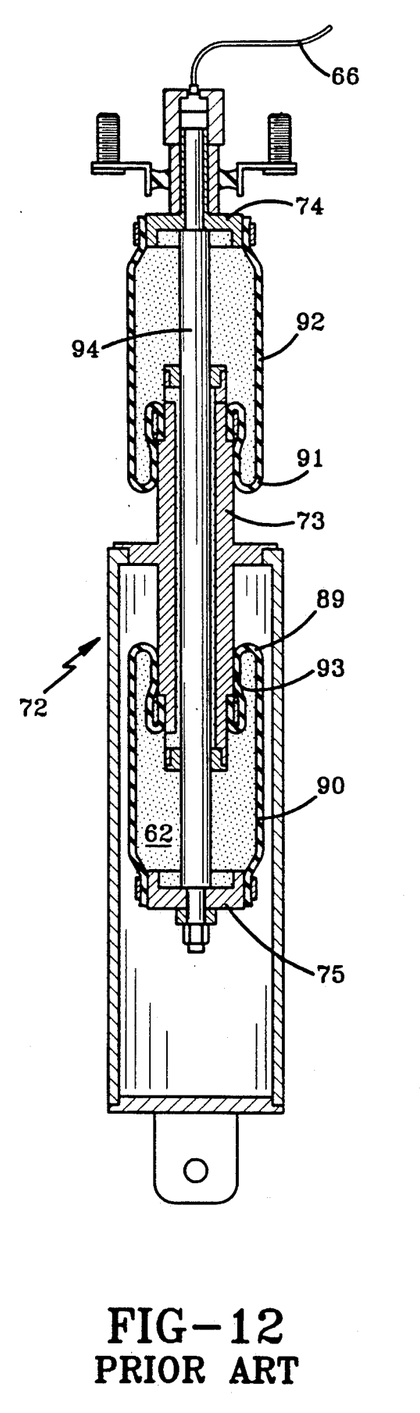
FIG. 12 is a sectional view similar to FIG. 2 showing the prior art damper of which the present invention is an improvement thereover.

Although the damping device as shown in FIG. 12, is satisfactory for many applications, the height thereof is approximately five times the stroke length of the movable piston therein. It is desirable for certain applications to provide such a damping device having a shorter axial length without sacrificing stroke length, due to the limited space provided in many vehicles for the mounting of the suspension system.

Furthermore, in prior art damping devices using an electrorheological fluid, the length of the orifice and electrodes in contact therewith, is determined by and dependent upon, the length of the stroke of the damping device. This limits the versatility and characteristics desired to be achieved by the damping device for certain applications.

Thus, the need exists for an improved damping device which has a shorter axial length than that of similar damping devices without shortening of the stroke length, and when used with an electrorheological fluid, enables the length of the restrictive orifice and electrode plates to be varied independent of the stroke length not believed possible with prior art damping devices.

SUMMARY OF THE INVENTION

Objectives of the invention include providing an improved vibration damping device, preferably of the type adapted to be incorporated within a vehicle suspension system, which solves the aforementioned problems of prior art dampers by reducing the axial length thereof without reducing the stroke length, and by enhancing the damping characteristics achieved thereby.

A still further objective of the invention is to provide such a damping device which when used with an electrorheological fluid, enables the restrictive orifice and associated electrode plate to vary in length independent of the stroke length, in order to achieve various damping characteristics.

Another objective of the invention is to provide such a damping device wherein internal members of the device are nestable within each other to enable the axial length or height thereof to be reduced, without sacrificing the damping effects achieved thereby.

A further objective is to provide such an improved damping device in which a volume compensating member is incorporated into the device to overcome any problems that could occur due to a change in volume as the incompressible damping fluid moves between chambers because of the use of tapered nesting members not present in prior art damping devices.

A still further objective of the invention is to provide such an improved damping device which may be incorporated with a usual air spring to achieve still further damping characteristics for various suspension applications, without affecting the basic construction and arrangement of the electrorheological fluid damping portion thereof.

A further objective of the invention is to provide such an improved damping device in which all of the rolling lobes of the elastomeric sleeves used in the device extend in a downwardly direction to reduce the possible accumulation of dirt and debris in the rolling lobe area as in prior art dampers, thereby reducing possible wear and damage to the elastomeric sleeves.

Another objective of the invention is to provide such an improved damping device in which the elastomeric sleeve clamping devices have a reinforcing backup band to enable fluid tight clamping to be achieved without possible damage to the component against which the sleeve is clamped, thereby enabling lightweight, metallic and dielectric plastic materials to be utilized in the construction of the device.

A still further objective of the invention is to provide such an improved damping device which is of a rugged, compact, relatively lightweight design, and which achieves the objectives in a relatively simple and efficient manner.

These objectives and advantages are obtained by the improved vibration damping device of the invention, the general nature of which may be stated as including spaced apart rigid first and second end members, the second end member having a tapered portion converging toward the first end member and formed with a hollow interior; a piston connected to the first end member by a rod extending through the tapered portion of the second end member, the piston having a tapered portion converging toward the hollow interior of the tapered portion of the second end member; first and second elastomeric sleeves sealingly connected to and extending between the first end member and the tapered portion of the second end member and between the piston and the tapered portion, respectively, to form a pair of separate fluid chambers; partition means within the interior of the tapered portion of the second end member for forming an elongated orifice in cooperation with the piston rod for controlling the flow of fluid between the pair of fluid chambers; and the tapered portion of the piston being nestable within the interior of the tapered portion of the second end member when the damping device is in a rebound position, and wherein damping of the device is controlled by movement of the fluid through the elongated orifice.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

The improved vibration damping device of the invention is indicated generally at 1, and the first embodiment thereof is shown in FIGS. 1-7. Device 1 includes an upper inverted, cup-shaped upper or first housing indicated generally at 2, which includes a cylindrical side wall 3 and an end wall 4 connected thereto by conical wall 5. Housing 2 is formed of a dielectric material and has an open end 6 and has a hollow interior 7. A post 8 extends upwardly from top wall 4 and is connected to a plurality of mounting bolts 9 by an elastomeric ring 10. Bolts 9 mount device 1 on a supporting structure, such as a vehicle, to provide damping thereto upon the vehicle tires experiencing depressions and bumps in a road surface.

The opposite end of damping device 1 includes a second inverted cup-shaped bottom or second housing indicated generally at 13, formed by a cylindrical side wall 14 which may have a plurality of cut-out areas 19 (FIG. 1) to reduce the weight of housing 13 and to provide additional clearance areas when device 1 is mounted in a close environment in a vehicle suspension system. The bottom end of housing 13 is closed by an end wall 15 on which is secured another mounting bracket 16 for mounting device 1 on another supporting structure. Housing 13 terminates in an open upper end 17 and forms a hollow interior 18. Housing 13 preferably is formed of a rigid lightweight metal, such as aluminum.

In accordance with one of the main features of the invention, a generally tapered intermediate member indicated generally at 20, is mounted within open end 17 of housing 13 by an annular flange 21 (FIGS. 2-4) and has a hollow interior 28. Intermediate member 20 includes a generally conical-shaped outer wall 22 which converges inwardly from annular flange 21 and extends toward open end 6 of upper housing 2. Wall 22 terminates in a top annular collar portion 23 having an annular outer shoulder 24 formed thereon. Intermediate member 20 further includes a cylindrical inner partition wall 25 which forms a hollow central bore 26 which extends axially substantially throughout interior 28 of intermediate member 20. Partition wall 25, in combination with conical outer wall 22, forms an annular tapered chamber 27 within the interior of intermediate member 20. Member 20 is formed of a lightweight metal, preferably aluminum, as is housing 13.

In further accordance with the invention, a piston indicated generally at 30, preferably formed of a plastic material, is movably mounted within interior 18 of lower housing 13 on the lower end of a metal rod 31. Rod 31 is connected to upper housing 2 within post 8, and extends axially through bore 26 of intermediate member 20 and through a cylindrical recess 32 formed in piston 30, before being secured to a bottom wall 33 by a bolt 34.

Preferably, an elastomeric bumper 36 is snap-fitted onto a grooved annular flange 37 which extends downwardly from piston bottom wall 33. It is readily seen that bumper 36 will contact the inner surface of end wall 15 of housing 13 should damping device 1 experience a severe movement in the jounce direction to prevent damage to piston 30 and to the other components of damping device 1.

Figure 5:
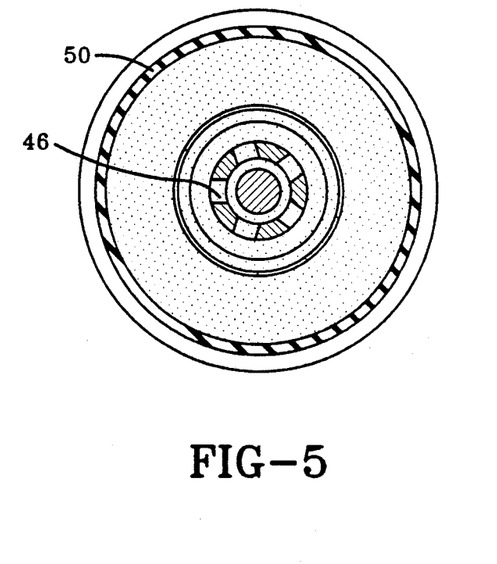
FIG. 5 is an enlarged sectional view taken on line 5—5, FIG. 2.
Figure 6:
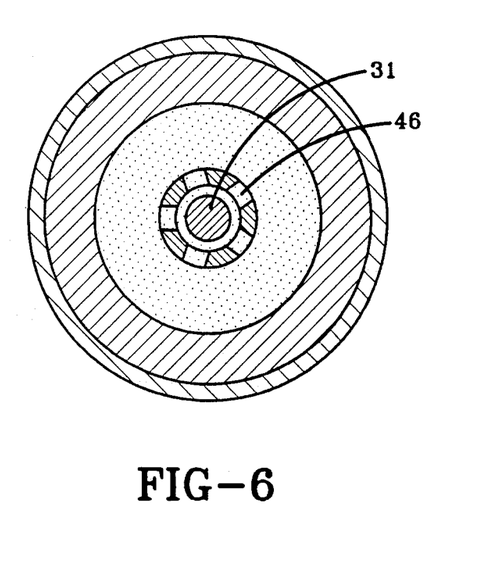
FIG. 6 is an enlarged sectional view taken on line 6—6, FIG. 2.
Figure 7:
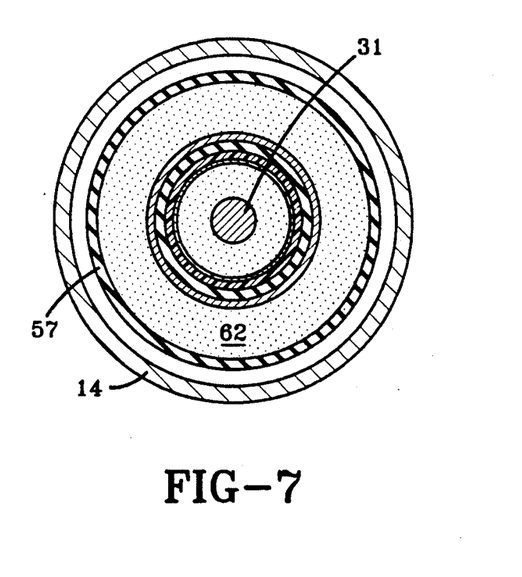
FIG. 7 is an enlarged sectional view taken on line 7—7, FIG. 2.

In still further accordance with the invention, piston 30 has a generally conical configuration including an upper conical wall 39 which converges inwardly toward an open bottom end 40 of intermediate member 20. Piston rod 31 preferably extends through a pair of spaced slide guides 42 and 43, which are formed of a dielectric plastic material and are press fitted into the spaced ends of inner partition wall 25 of intermediate member 20. Rod 31 forms an annular orifice 44 between the inner cylindrical surface of partition wall 25 and the outer surface of rod 31. A plurality of openings 46, shown particularly in FIGS. 5 and 6, are formed in the ends of partition wall 25 adjacent slide guides 42 and 43, the purpose of which is described further below.

Figure 1:
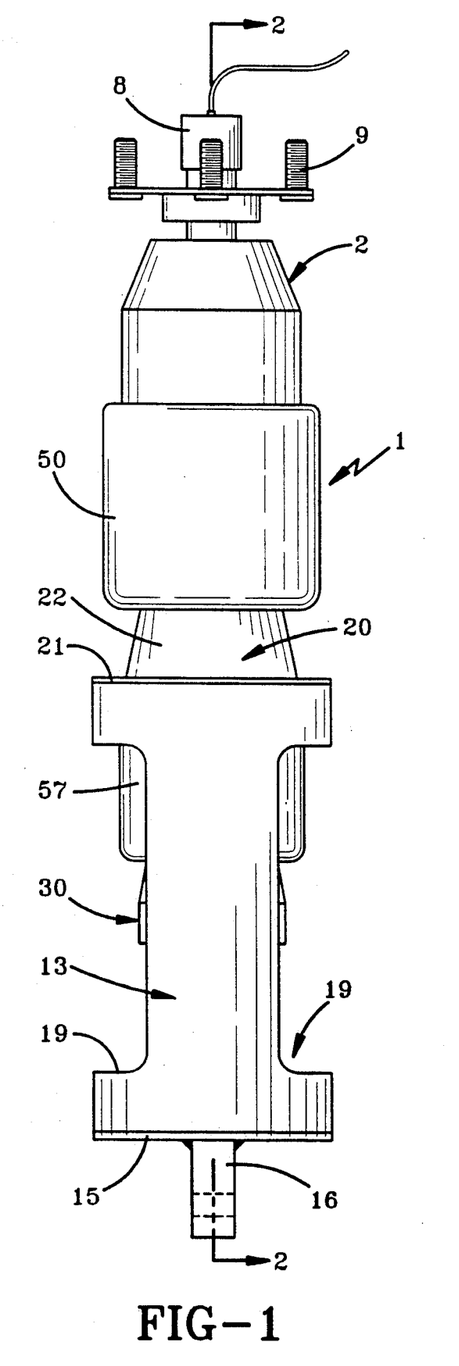
FIG. 1 is a side elevational view of the improved damper in an at-rest position.
Figure 2:
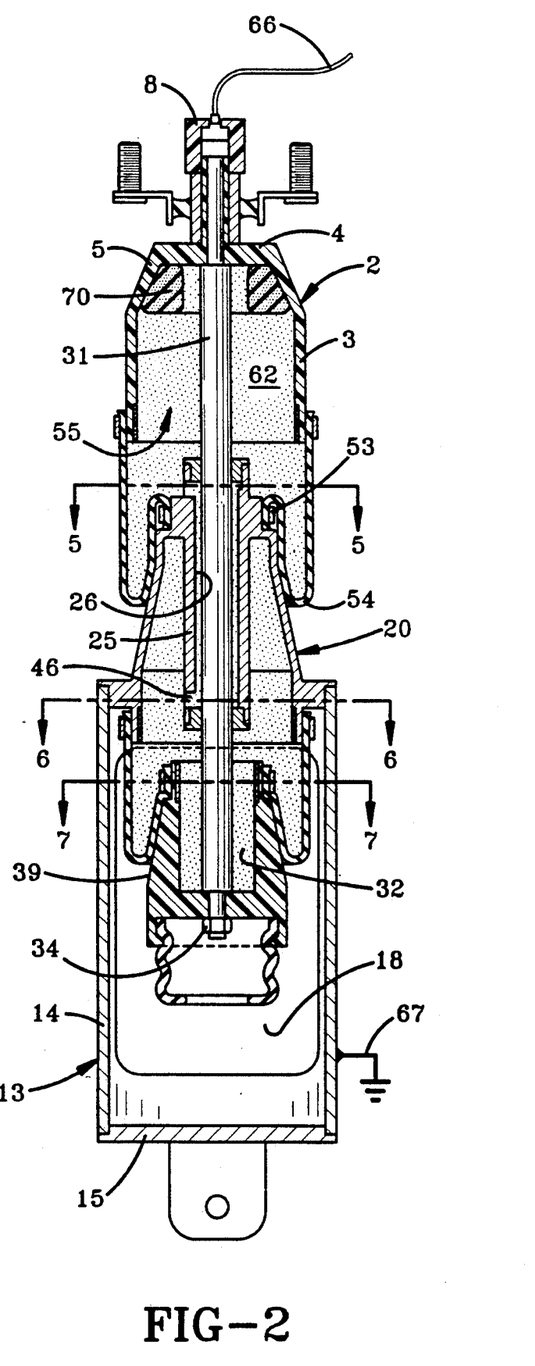
FIG. 2 is a longitudinal sectional view of the damper taken on line 2—2, FIG. 1.
Figure 4:
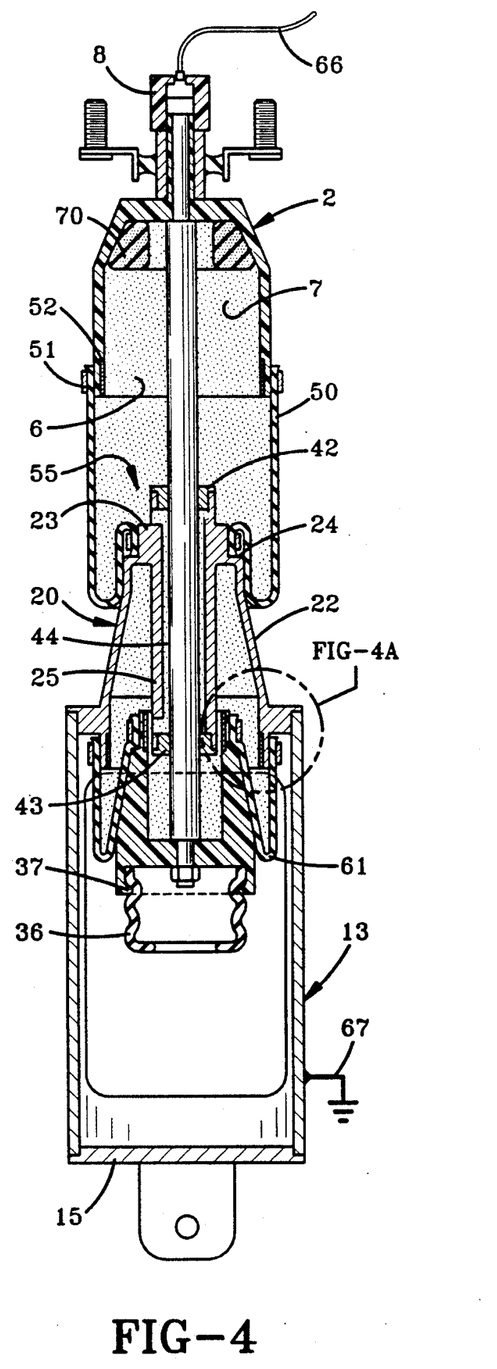
FIG. 4 is another sectional view similar to FIGS. 2 and 3 with the damper being shown in a partial rebound position.
Figure 4A:
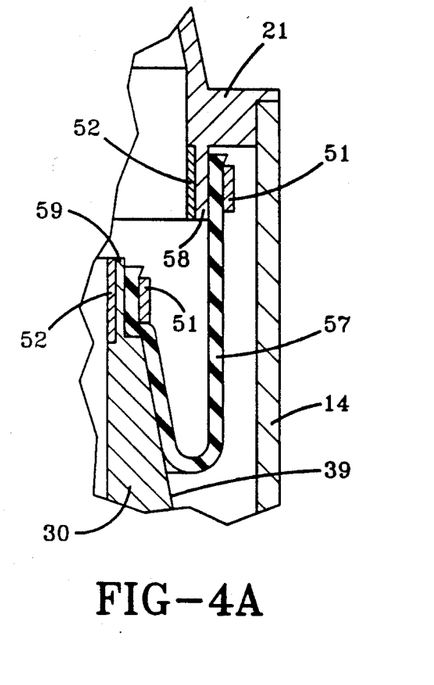
FIG. 4A is an enlarged fragmentary sectional area taken from FIG. 4.

A first elastomeric sleeve 50 has one of its open ends clamped and sealed against the bottom of upper housing side wall 3 adjacent open end 6 thereof, by a clamp assembly consisting of an outer clamping band 51 and a reinforcing concentric steel backup inner ring 52 (FIG. 4). Ring 52 is mounted within a recessed shoulder formed in housing wall 3 adjacent open end 6 thereof, and provides sufficient strength for the clamping of the sleeve end against wall 3 by outer band 51. The opposite open end of elastomeric sleeve 50 is secured in a fluid tight clamping engagement with annular collar 23 of intermediate member 20 by another clamping band 53. This end of sleeve 50 is provided with a rolling lobe 54, which when the damper is in a generally at-rest position as shown in FIG. 2 extends along conical wall 22 of intermediate member 20. Interior 7 of upper housing 2, in combination with the interior of elastomeric sleeve 50, form an upper fluid chamber indicated generally at 55.

A second elastomeric sleeve 57 is secured in a fluid tight relationship with an annular shoulder 58 which extends downwardly from annular flange 21 of intermediate member 20, by another clamping assembly as described above, consisting of clamping band 51 and backup ring 52. The other end of elastomeric sleeve 57 is secured and sealed in a fluid tight relationship by a similar clamping assembly within an annular shoulder 59 formed in the upper end of piston 30. Tapered chamber 27 of intermediate member 20, in combination with the interior of sleeve 57, form a second fluid chamber indicated generally at 60, which communicates with upper fluid chamber 55 through annular orifice 44. In the preferred embodiment, chambers 55 and 60 are filled with an electrorheological fluid 62, such as of the type discussed in U.S. Pat. Nos. 4,858,733, 4,973,031 and 4,687,589.

Piston rod 31, at its upper extremity, is connected to a high voltage generating means (not shown) through a wire 66 which applies a positive voltage to the rod. Cylindrical wall 25 of intermediate member 20 is connected to ground through a grounding wire 67 which is connected to bottom member housing wall 14. Wall 25 forms the electrode plate for contacting the electrorheological fluid 62 as it passes through orifice 44 to achieve the desired change in the viscosity of fluid 62, to effect the damping achieved by device 1, in a manner well known in the art.

A volume compensating member 70 is mounted in the upper end of housing 2, and preferably will be a ring-shaped member formed of a closed cell, low density urethane-type material. This material will contain sufficient air bubbles which will enable member 70 to compress and expand to compensate for volume changes within fluid chambers 55 and 60 upon movement of tapered piston 30 within damping device 1 as described further below, and thus will avoid excessive outward bowing of elastomeric sleeves 50 and 57.

Figure 3:
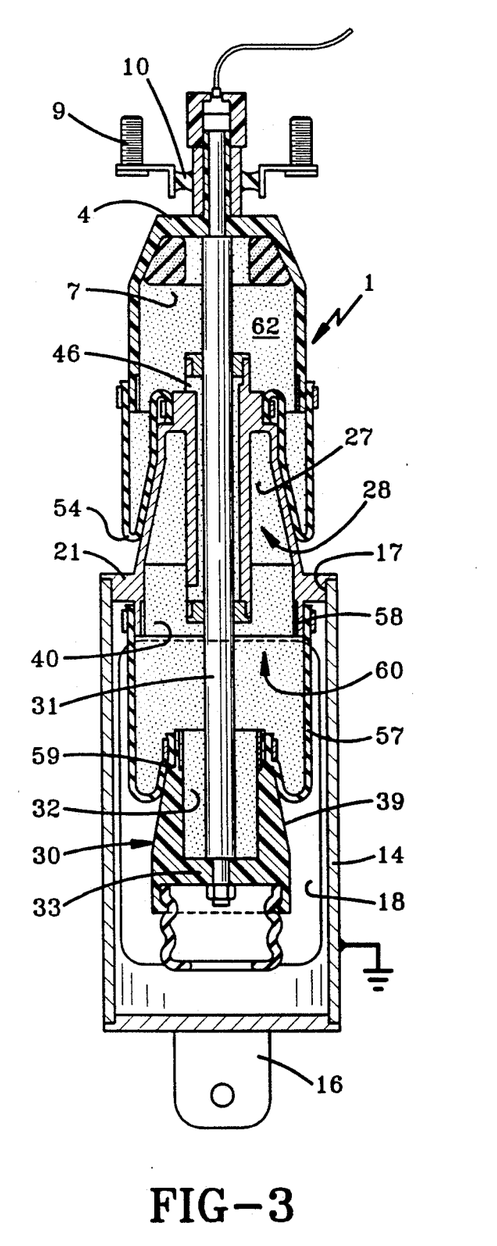
FIG. 3 is a sectional view similar to FIG. 2 with the damper being shown in a partial jounce position.

The operation of improved damping device 1 is best illustrated by reference to FIGS. 2, 3 and 4. FIG. 2 shows damping device 1 in its usual at-rest position wherein fluid 62 will generally fill fluid chambers 55 and 60 and annular orifice 44. Upon the vehicle or other equipment on which device 1 is mounted experiences road bumps and depressions, device 1 will move between a jounce position as shown in FIG. 3 and a rebound position as shown in FIG. 4. During this movement fluid 62 will pass through orifice 44 caused by the movement of piston 30 and connected upper housing 2 with respect to lower housing 13 and connected intermediate member 20, providing the desired damping effect in relationship to the voltage applied to piston rod 31.

In accordance with one of the principles of this invention, when device 1 is in a jounce position (FIG. 3), the tapered configuration of intermediate member 20 enables member 20 to become nested and slidably received within interior 7 of upper housing 2, with rolling lobe 54 moving along conical wall 22 of member 20. As shown in FIG. 3, intermediate member 20 is only partially nested within interior 7 of housing 2 and will telescope or nest further therein upon a more severe jounce condition being encountered.

Upon damping device 1 entering the rebound position (FIG. 4), upper housing 2 will move axially away from bottom housing 13 via connecting rod 31. The tapered configuration of piston 30 enables the piston to be nested and slidably received within tapered chamber 27 of intermediate member 20. When piston 30 moves into the interior of member 20, rolling lobe 61 of elastomeric sleeve 57 will move along tapered wall 39 of piston 30, thus preventing sleeve 57 from being pinched or cut against surrounding surfaces.

The nestability of intermediate member 20 due to its tapered configuration, within the interior of upper housing 2, and the nestability of piston 30, also due to its tapered configuration, within the interior of intermediate member 20, enables the improved damping device 1 to have the same general stroke length as a prior art damper of a greater axial length or height, indicated at 72 and shown in FIG. 12, of which the present damper is an improvement thereover.

Prior art damper 72 is similar in many respects to improved damper 1 but includes a cylindrical intermediate member 73 and disc shaped end plates 74 and 75. This arrangement provides no nestability and requires a damper having an overall length greater than that of improved damper 1 in order to achieve the same stroke length. The manner of operation of prior art damper 72 is similar to that described above with respect to damper 1 and is shown and described in pending U.S. application Ser. No. 570,659 filed Aug. 21, 1990, the subject matter of which is incorporated herein by reference in the interest of full disclosure.

Figures 8, 9:
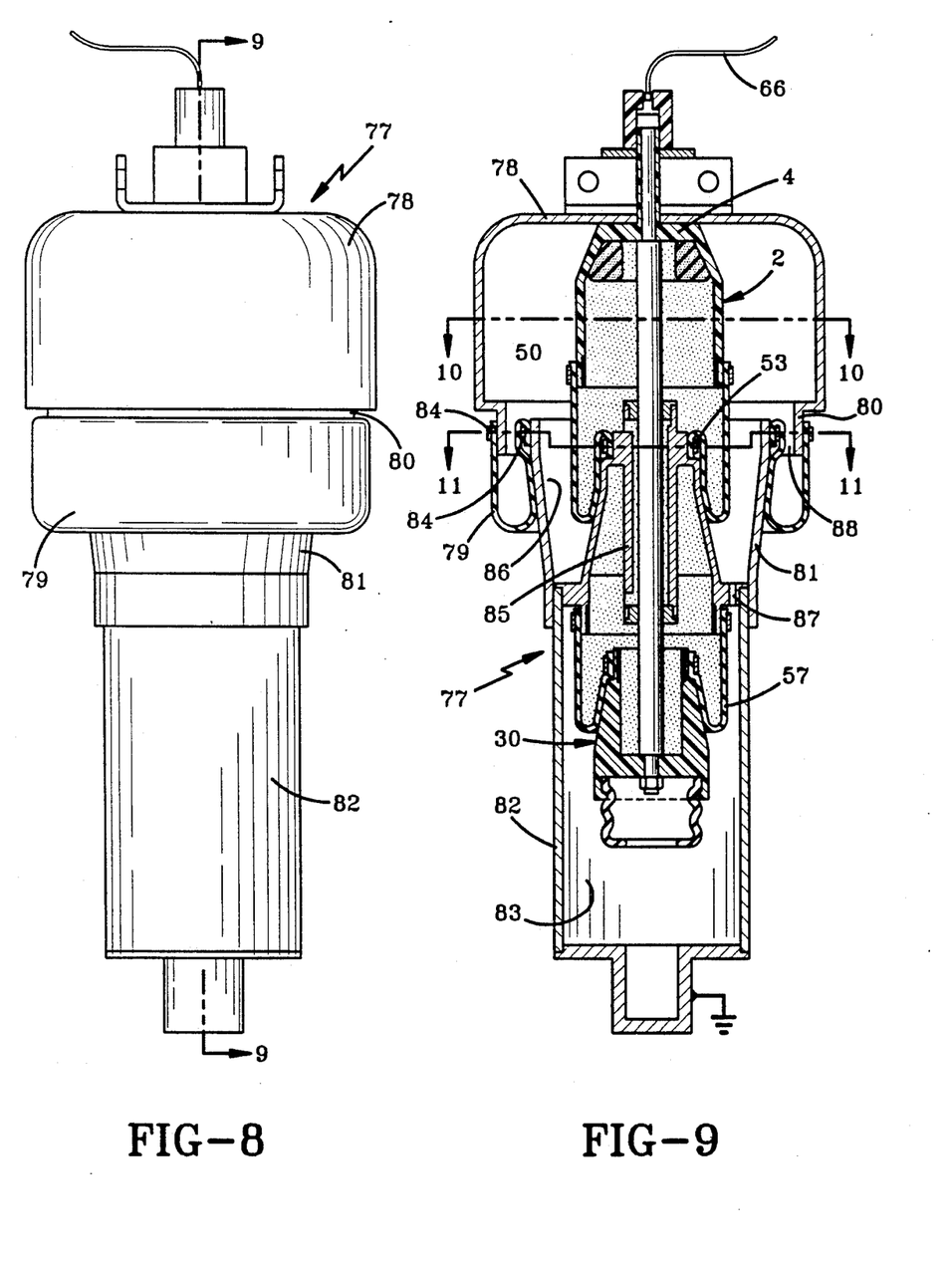
FIG. 8 is a side elevational view of a modified embodiment showing the damper of FIG. 1 in combination with an air spring.
FIG. 9 is a longitudinal sectional view taken on line 9—9, FIG. 8.
Figure 10:
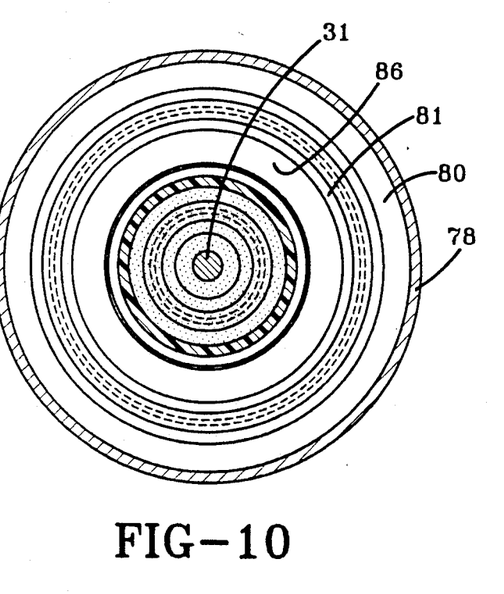
FIG. 10 is an enlarged sectional view taken on line 10—10, FIG. 9.
Figure 11:
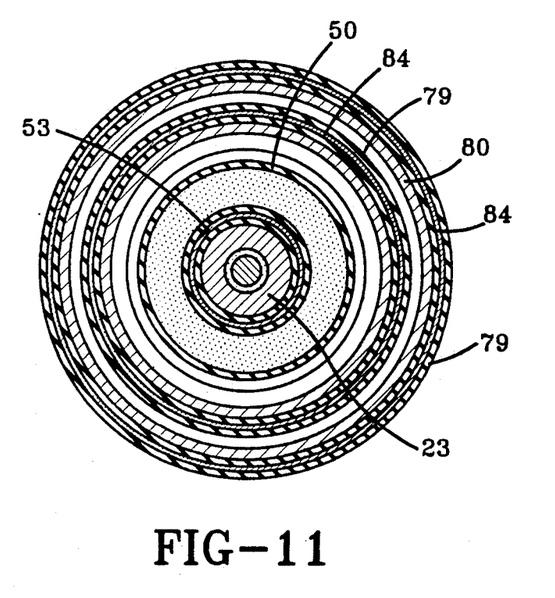
FIG. 11 is an enlarged sectional view taken on line 11—11, FIG. 9.

A modified form of the improved damping device is indicated generally at 77, and is shown particularly in FIGS. 8 and 9. Device 77 is similar to device 1 described above and therefore those features in common will not be repeated but are incorporated herein by reference. Damping device 77 include a third housing 78 which has an inverted cup-shaped configuration similar to housing 2, and is connected to housing 2 and extends concentrically thereabout as shown particularly in FIG. 9. A third elastomeric sleeve 79 is connected and sealed in a fluid tight relationship about an annular flange 80 formed on the bottom of housing 78 and which forms an open end 88, and is connected at its other end to an upper end of a conical extension 81, the lower end of which is secured to the upper end of a bottom housing 82. Housing 82 is generally similar to housing 13 described above for embodiment 1, but preferably is a continuous member in order to form an enclosed fluid chamber 83 for containing a compressible gas, such as air. The ends of sleeve 79 are secured to their respective members by clamping rings 84 in a manner well known in the art. Housing 78, in combination with sleeve 79 and conical extension 81, form an upper fluid chamber 86 which communicates with lower fluid chamber 83, through a plurality of holes 87 formed in annular flange 21 of intermediate member 20.

Modified damping device 77 therefore combines a usual air spring provided by housing 78 and elastomeric sleeve 79 with damping device 1 described above, to provide damping to a vehicle or other equipment, achieved by a usual air spring and achieved by device 1 containing the electrorheological fluid flowing through restricted orifice 44.

Another advantage of improved damping devices 1 and 77 is the ability to vary the length of orifice 44 and the electrode plate associated therewith, which is provided by adjacent cylindrical partition wall 25, independent of the stroke length, as required in prior art damper 72 of FIG. 12, due to the nestability of piston 30 and intermediate member 20. This enables various damping characteristics to be achieved by being able to vary the amount of electrical force applied to the electrorheological fluid moving through orifice 44 to provide a greater change in the viscosity of fluid 62.

Improved devices 1 and 77 overcome one of the disadvantages of prior art damper 72, in that in damper 72, rolling lobe 89 of lower elastomeric sleeve 90, faces rolling lobe 91 of upper elastomeric sleeve 92, and is susceptible to the accumulation of dirt or other foreign objects in area 93 where rolling lobe 89 engages the side wall of intermediate member 73, possibly creating friction and imparting subsequent wear to sleeve 90.

In prior art damper 72, the volume change between the spaced chambers is constant as end plate 75 moves with end plate 74 via rod 94, whereas in the present invention the volume will change within the chambers due to the tapered configurations of piston 30 and intermediate member 20. However, this change in volume is compensated for by the use of compensating member 70, and therefore eliminates any potential problem that could be caused thereby.

Therefore, the improved damping device of the present invention enables the same stroke length to be achieved as in prior art damping devices, especially those using an electrorheological fluid, in a shorter axial length structure, thereby increasing its versatility for mounting within the close confines of vehicle suspension systems, due to the nestability of piston 30 and intermediate member 20. Furthermore, devices 1 and 77 provide versatility of design by enabling the length of the restrictive flow orifice and the electrode plate associated therewith, to be varied independent of the stroke length, thereby increasing the electrical force which is applied to the electrorheological fluid moving through orifice 44.

Accordingly, the improved damping device is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of this invention is not limited to the exact details shown or described.

Having now described the features, discoveries and principles of the invention, the manner in which the improved damping device is constructed and used, the characteristics of the construction, and the advantageous, new and useful results obtained; the new and useful structures, devices, elements, arrangements, parts and combinations, are set forth in the appended claims.

We claim:

1. A vibration damping device including a first housing having a hollow interior and formed with an open end; a rigid intermediate member having a tapered outer wall converging from an open end of said intermediate member toward the open end of the first housing and forming a tapered hollow interior within said intermediate member, and having an inner wall located within the tapered hollow interior forming a bore which extends through said hollow interior toward the open end of said intermediate member and terminating in an extended end; a piston having a tapered outer surface and formed with a recess; a rigid member extending between and connecting the first housing to the piston, said rigid member extending through the bore of the inner wall of the intermediate member forming an orifice therebetween, and extending into the piston recess; a first elastomeric sleeve extending between and sealingly connected to the open end of the first housing and an adjacent end of the intermediate member and forming a first fluid chamber in combination with the interior of the first housing, said first sleeve having a rolling lobe extending along the tapered outer wall of the intermediate member; a second elastomeric sleeve extending between and sealingly connected to another end of the intermediate member and an adjacent end of the piston, and forming a second fluid chamber in combination with the hollow interior of the intermediate member, said second chamber communicating with the first chamber through the orifice, and said second sleeve having a rolling lobe extending along the piston; and wherein the tapered outer wall of the intermediate member moves within the interior of the first housing when the damping device moves towards a jounce condition, and the tapered outer surface of the piston moves within the hollow interior of the intermediate member and the extended end of the bore forming inner wall of the intermediate member moves within the recess of the piston when the damping device moves toward a rebound condition.

2. The vibration damping device defined in claim 1 in which the first and second fluid chambers contain an electrorheological fluid.

3. The vibration damping device defined in claim 2 in which electrode means is arranged in the orifice for contacting the electrorheological fluid within said orifice.

4. The vibration damping device defined in claim 1 in which an elastomeric bumper is mounted on a lower end of the piston.

5. The vibration damping device defined in claim 1 in which spaced slide guides are mounted on the intermediate member and are in sliding engagement with the rigid connecting member.

6. The vibration damping device defined in claim 1 in which a volume compensating member is mounted within the interior of at least one of the fluid chambers.

7. The vibration damping device defined in claim 6 in which the compensating member is a closed cellular foam member.

8. The vibration damping device defined in claim 1 in which the bore forming the inner wall of the intermediate member is formed of metal.

9. The vibration damping device defined in claim 1 in which the rigid connecting member is a cylindrical rod; and in which the inner wall of the intermediate member forms a cylindrical bore for receiving the rod therein to form said orifice as an annular orifice surrounding said rod.

10. The vibration damping device defined in claim 1 in which fastening means is mounted on the first housing and on the intermediate member for securing said housing and intermediate member to spaced apart structures for damping vibrational forces executed on said structures.

11. The vibration damping device defined in claim 1 in which a third rigid housing is mounted on and extends about the first housing and has an open end; and in which a third elastomeric sleeve is sealingly connected to and extends between the open end of the third housing and the open end of the second housing to form a third fluid chamber.

12. The vibration damping device defined in claim 11 in which the third fluid chamber communicates with the interior of the second housing; and in which the third fluid chamber contains a compressible gas.

13. The vibration damping device defined in claim 1 including clamping band means for sealingly connecting open ends of the elastomeric sleeves to their respective housing and intermediate member; and in which certain of the clamping band means include a rigid backup band reinforcing the respective housing or intermediate member and a concentric outer band clamping the elastomeric sleeve against the respective housing or intermediate member.

14. The vibration damping device defined in claim 1 including a second housing having a hollow interior and formed with an open end facing the open end of the first housing.

* * * * *